United States Patent [19]

Fujimoto

[11] Patent Number: 4,498,097
[45] Date of Patent: Feb. 5, 1985

[54] COLOR TELEVISION SIGNAL PRODUCING DEVICE CAPABLE OF COMPENSATING THE COLOR SIGNAL

[75] Inventor: Ryo Fujimoto, Kanagawa, Japan

[73] Assignee: Canon Kabushiki Kaisha, Tokyo, Japan

[21] Appl. No.: 420,622

[22] Filed: Sep. 21, 1982

[30] Foreign Application Priority Data

Oct. 7, 1981 [JP] Japan .................... 56-159956

[51] Int. Cl.³ ............................... H04N 9/535
[52] U.S. Cl. ........................ 358/12; 358/27; 358/16
[58] Field of Search ............. 358/15, 16, 27, 21 R, 358/29, 35, 37, 40, 12

[56] References Cited

U.S. PATENT DOCUMENTS

| 4,200,881 | 4/1980 | Carnt | 358/16 |
| 4,268,854 | 5/1981 | Ozawa | 358/27 |
| 4,276,560 | 6/1981 | Watanabe | 358/27 |
| 4,306,247 | 12/1981 | Tomimoto | 358/27 |
| 4,388,638 | 6/1983 | Dischert | 358/27 |

OTHER PUBLICATIONS

Koblos, A Simplified Television Color Encoder, Journal SMPTE, Sep. 1968, vol. 77, pp. 909–911.

Primary Examiner—Michael A. Masinick
Attorney, Agent, or Firm—Toren, McGeady and Stanger

[57] ABSTRACT

Disclosed is a color television signal producing device in which the color signal is subject to compensation by controlling the amplitude and/or the phase of the auxiliary carrier when the auxiliary carrier is modulated by the input color signal to produce the carrier color signal.

5 Claims, 6 Drawing Figures

COLOR TELEVISION SIGNAL PRODUCING DEVICE CAPABLE OF COMPENSATING THE COLOR SIGNAL

BACKGROUND OF THE INVENTION

1. Field of the Invention

The present invention relates to a color television signal producing device, particularly one capable of compensating the color signal.

2. Description of the Prior Art

Until now, the input color signal to be applied to an encoder which modulates the auxiliary carrier with the input color signal or the color difference signal has been subject to compensation in advance.

However, quite recently the scale of integrated circuits ICs has been enlarged to allow the circuits from the process circuit on to the encoder to be integrated. This makes it possible to take out the encoder input and modify it. However, in most cases it has been difficult to carry out the compensation in the IC due to the limit in the number of pins or manufacturing problems of the IC. Further, it is possible to subject the output of the encoder to compensation, i.e., the carrier color signal modulated by the auxiliary carrier. It is difficult to subject the phase to compensation though it is easy to subject the amplitude to compensation.

SUMMARY OF THE INVENTION

In view of the above shortcomings of the prior arts it is an object of the present invention to provide a color television signal producing device capable of subjecting the phase and/or the amplitude of the carrier color signal to compensation even when the circuits from the process circuit up to the encoder are integrated, and more particularly to provide a color television signal producing device capable of applying compensation to the color signal by controlling the amplitude and/or the phase of the auxiliary carrier to be applied to the encoder.

Further other objects and features of the present invention will become apparent from the following explanation of embodiments of the invention when read in light of the accompanying drawings.

DESCRIPTION OF THE PREFERRED EMBODIMENT

Figure 1:
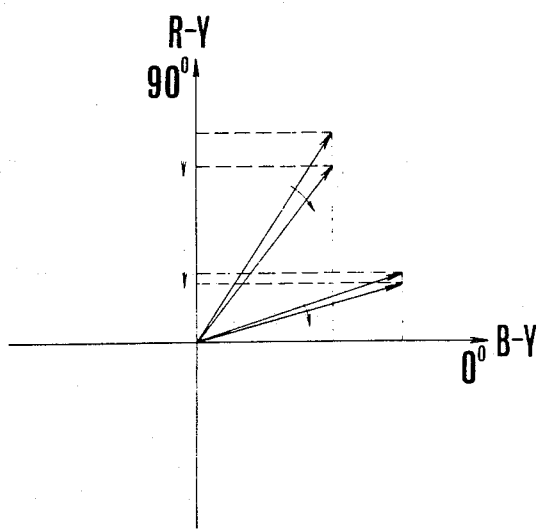
FIG. 1 shows a vector diagram of the carrier color signal.

FIG. 1 shows the composite vector diagram of the carrier color signals. In the following embodiment only the phase of the colors in the first quadrant are subject to compensation in the right-handed rotation, while the phase of the colors in other quadrants are not subect to compensation.

Figure 2:
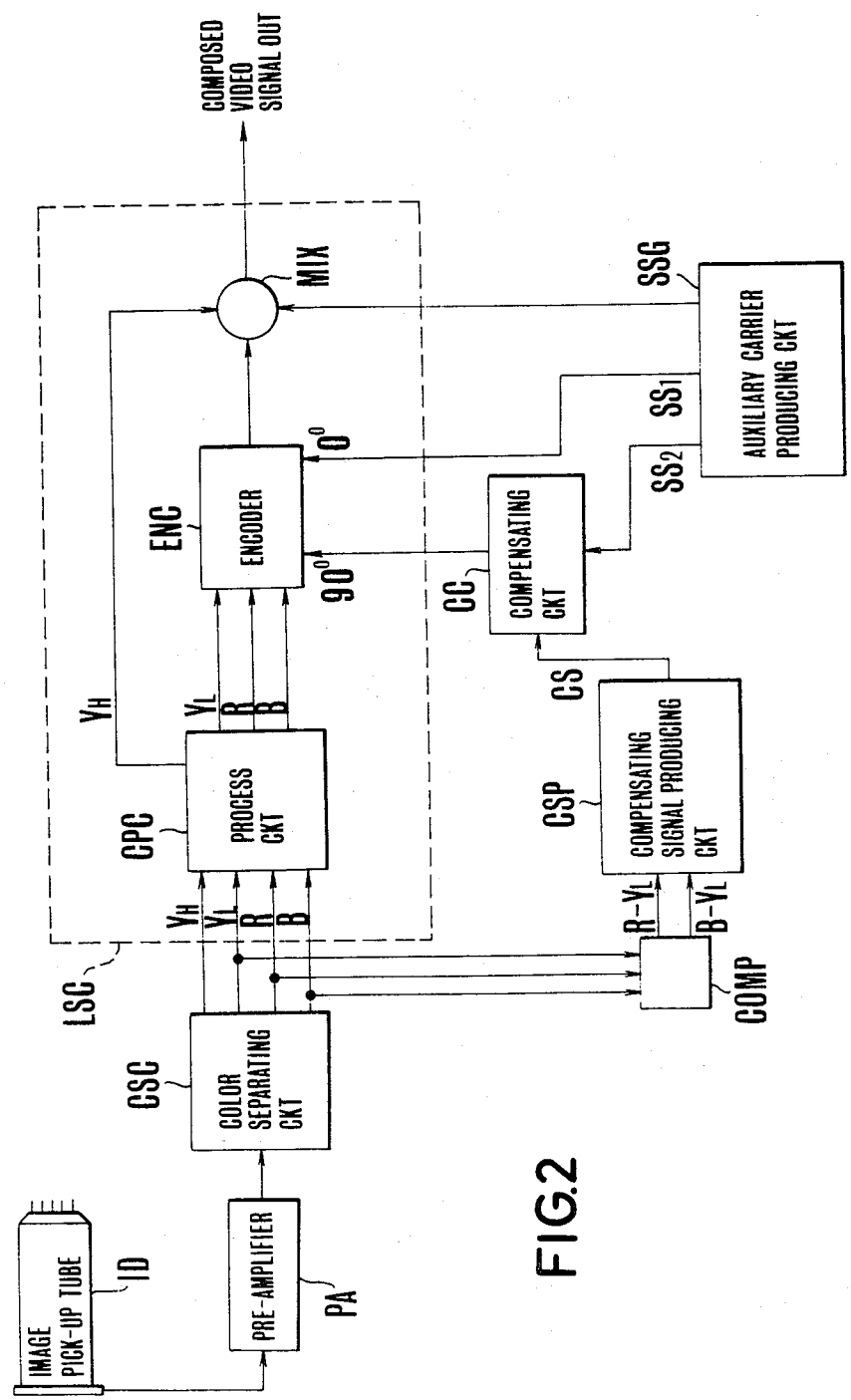
FIG. 2 shows a block circuit diagram of an embodiment of the color image pick-up device.

FIG. 2 shows the block diagram of the color television image pick-up device including its compensation portion. The signals from the image pick-up tube ID are delivered to the color separating circuit CSC via the pre-amplifier PA and the high frequency brightness signal YH, the low frequency brightness signal YL, the red signal R and the blue signal B emerge from the circuit CSC. These signals YH, YL, R and B pass through the process circuit CPC, the encoder ENC and the mixing circuit MIX in the integrated circuit LSC and emerge as the final composite video signal. The auxiliary carrier producing circuit SSG produces auxiliary carrier frequency signals SS1 and SS2. The phase of the signal SS2 leads the signal. The signals YL, R and B produced by the color separating circuit CSC are formed into the signals R-YL, B-YL in the composing circuit COMP. The auxiliary signal producing circuit CSP produces the compensation signal CS from the signals R-YL and B-YL so as to control the amplitude and the phase of the auxiliary carrier signal CS in the compensating circuit CC.

Figure 3:
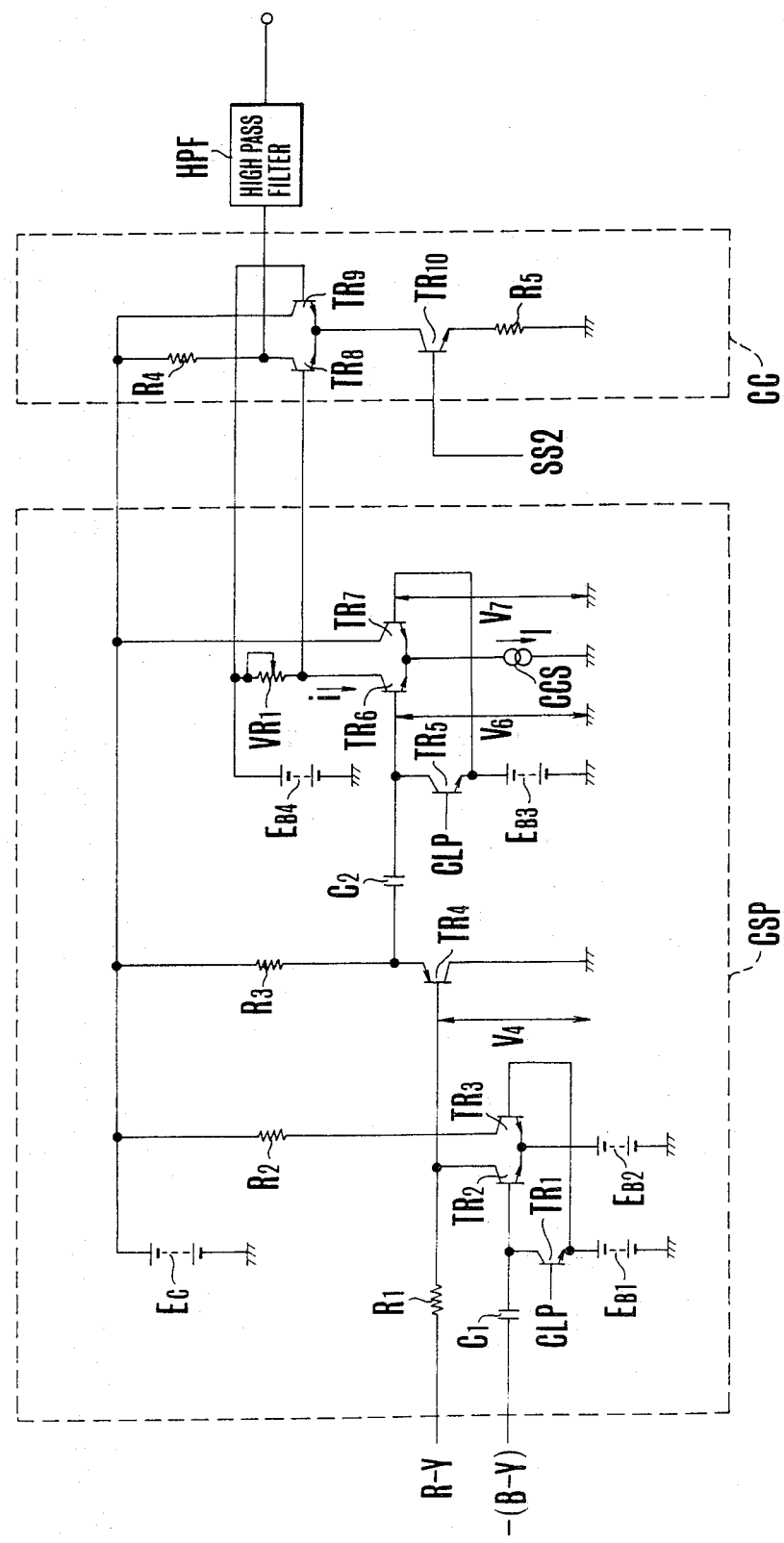
FIG. 3 shows in detail a part of the circuit in FIG. 2.
Figure 4:
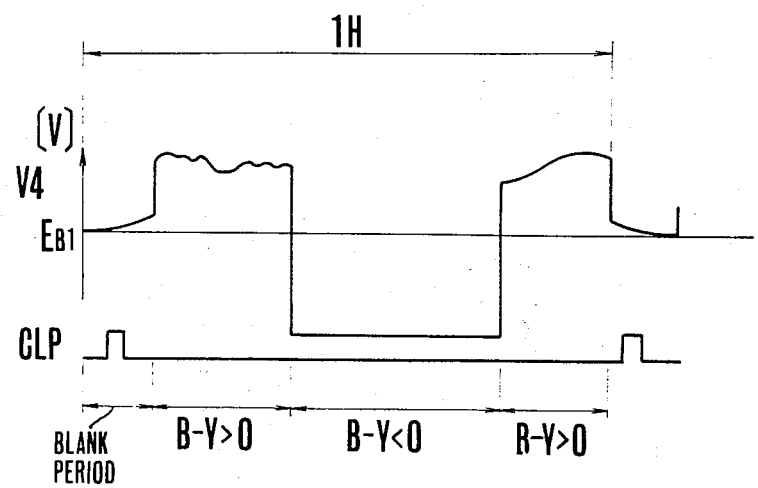
FIG. 4 shows the base voltage of the transistor TR4 in FIG. 3.
Figure 5:
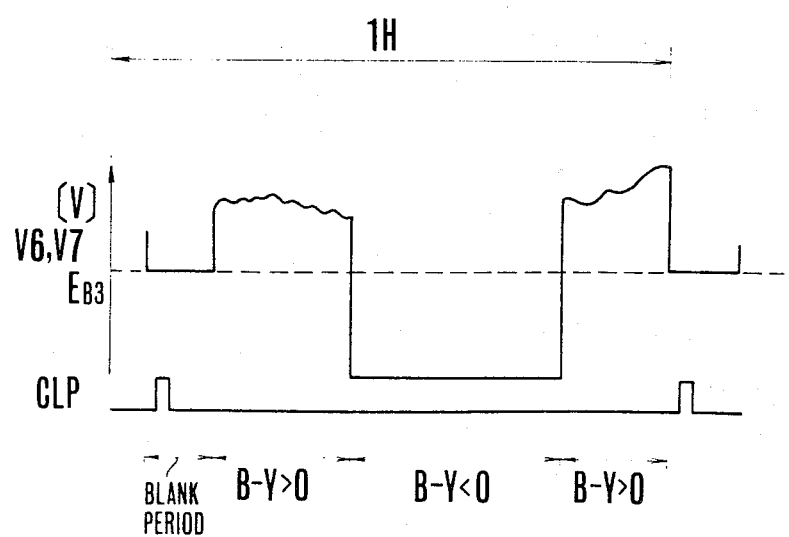
FIG. 5 shows the base voltage of the transistors TR6 and TR7 in FIG. 3.

Details of the compensation signal producing circuit CSP and the compensating circuit are explained in connection with FIG. 3. The signal $-(B-Y)$ whose black level is clamped at EB1 by the clamp pulse CLP and the clamp voltage EB1 respectively applied to the transistors TR2 and TR3, so the signal (R-Y) is not transferred to the transistor TR4 when $-(B-Y)>0$, i.e. $(B-Y)<0$. The emitter voltage EB2 of the transistors TR2 and TR3 are chosen to be low enough so that the level of the signal $-(B-Y)$ is never lower than the voltage EB2. As mentioned above, when $(B-Y)>0$ the signal (R-Y) is applied to the base of the transistor TR4, while $(B-Y)\leq 0$ the base potential V4 of the transistor TR4 becomes lower. FIG. 4 shows the base potential of the TR4 in the clamp period, $(B-Y)\leq 0$ period, and $(B-Y)>0$ period. The base potential of the transistor TR4 is applied to the collector of a transistor TR5 and the base of a transistor TR6 via emitter follower transistor TR4 and the capacitor C2. The black level is clamped at the voltage VB3 by the clamp pulse CLP at the transistor TR5. The voltage EB3 is applied to the base of the transistor TR6, the clamped signal (hereinafter (R-Y)′) and to the base of the transistor TR1. FIG. 5 shows the base potentials V6 and V7 of the transistors TR6 and TR7 in a solid and a dotted line respectively. The emitter of the transistor TR6 and that of the TR7 are in common so that only when (R-Y)′>EB3 does the current I of the constant current source CCS run through the collector of the TR6. When (R-Y)′=EB3 the current is I/2 and in the neighborhood of EB3 the current assumes the corresponding value. However, such a range is 0-several ten mV in difference between the base potential of the TR6 and that of the TR7. However, the signals R-Y and B-Y are as large as several V so that it can be assumed that when (R-Y)′>EB3 the current is I, while (R-Y)′<EB3 the current is 0.

In conclusion, when (B-Y)>0 and (R-Y)>0 the current I flows through the collector of the transistor TR6, so a voltage drop takes place in the variable resistance VR1 connected to the collector. This is connected to the base of the transistor TR8 so the auxiliary carrier signal SS2 is reduced by the corresponding amount at the output. That is, when (R-Y)>0 and (B-Y)>0, the auxiliary carrier signal SS2 with reduced amplitude is produced. When the output is applied to the encoder ENC as an auxiliary carrier with a phase advanced by 90° via the high pass filter HPF, the auxiliary carrier SS1 with 0°, whose amplitude remains same, is compensated at the right-handed rotation in phase as is shown in FIG. 1.

Figure 6:
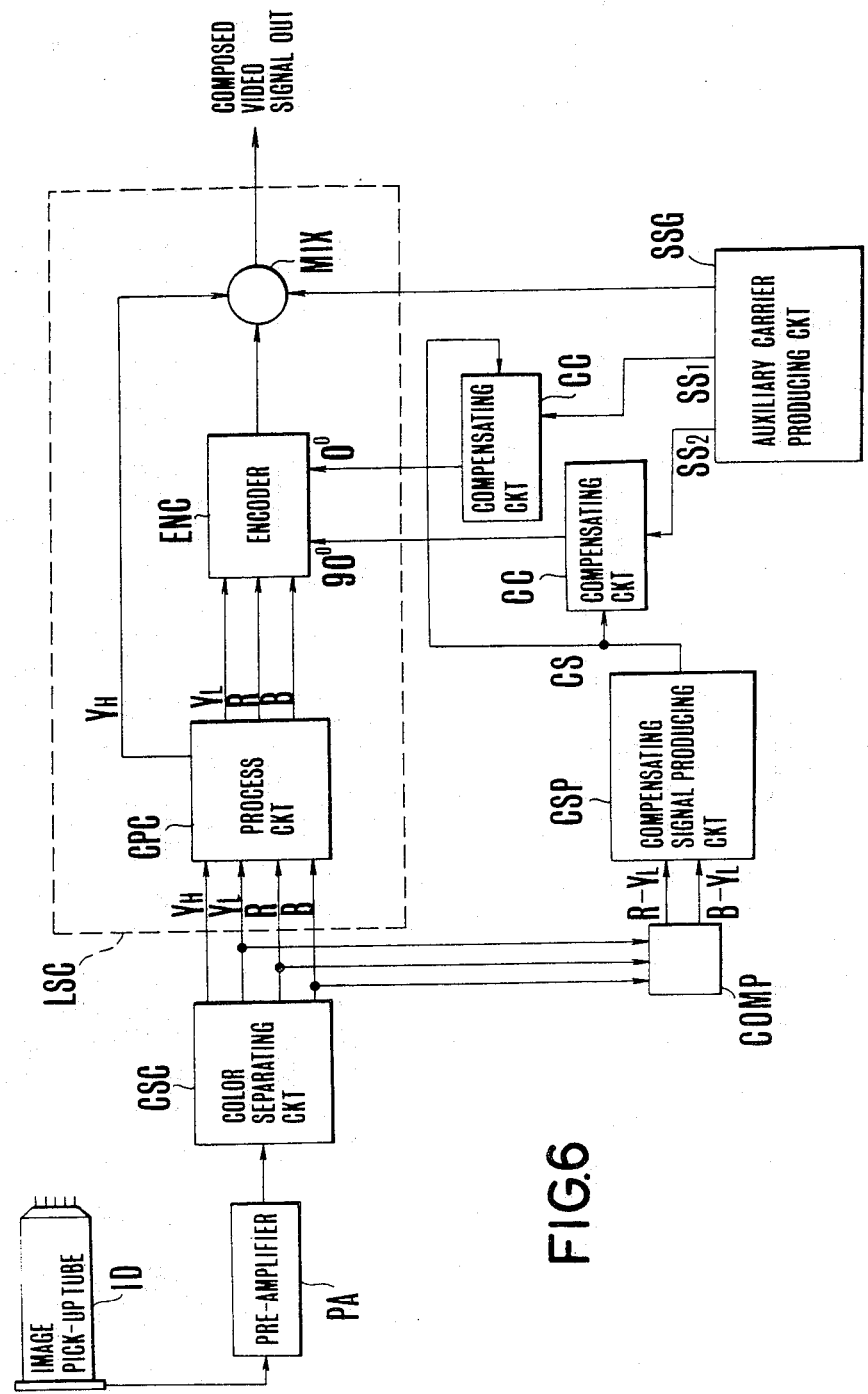
FIG. 6 shows the block circuit diagram of another embodiment of the color image pick-up device.

The compensation portion can be an amplifier with a variable amplification by changing the bias or a balanced modulator. Further, although in the embodiment shown in FIGS. 1 to 5 the phase of the carrier color signal is varied, the amplifier of the carrier color signal is compensated when also the color compensation signal is applied to the auxiliary carrier SS with 0° phase as is shown in FIG. 6. The members in FIG. 6 having the same figures as those in FIG. 2 are the same members.

Although in the above embodiment the amplitude of the auxiliary carrier is controlled it is possible to control the phase of the auxiliary carrier by adopting the conventional phase change circuit as the compensating circuit.

As explained so far in accordance with the present invention the amplitude or the phase of the auxiliary carrier to be applied to the encoder is varied so that even when the carrier color signal is produced with a LSC the carrier color signal can be compensated easily. Further, it is not necessary to provide the LSC with a new output or a new input terminal for compensation so that the IC does not become complicated.

Further, the present invention is not limited to the above embodiment but can be modified in many ways in the gist of the claim.

What I claim:

1. A color television signal producing device comprising:

generating means for generating two auxiliary sub-carriers of the same frequency but having a phase difference of 90° C.;
    a carrier color signal producing means for modulating the two sub-carriers with an input color signal into the carrier color signal;
    detecting means for detecting a predetermined color phase of said input color signal; and
    control means for variably controlling amplitude and/or color phase of the at least one of the carriers in response to the output of said detecting means.

2. A color television signal producing device in accordance with claim 1 further comprising image pick-up means for picking up the object image.

3. A color television signal producing device according to claim 1, wherein said detecting means produces a predetermined output in correspondence to values of a blue color difference signal and a red color difference signal.

4. A color television signal producing device according to claim 3, wherein said detecting means produces a predetermined output in correspondence to the positiveness or negativeness of said blue color difference signal and said red color difference signal.

5. A color television signal producing device according to claim 1, wherein said carrier color signal producing means includes an integrated circuit which is separated from said generating means, the detecting means and the control means.

* * * * *